Aug. 5, 1958 T. F. JONES 2,845,889
METHOD OF FORMING A FLOW CONDUIT
Filed Aug. 25, 1953
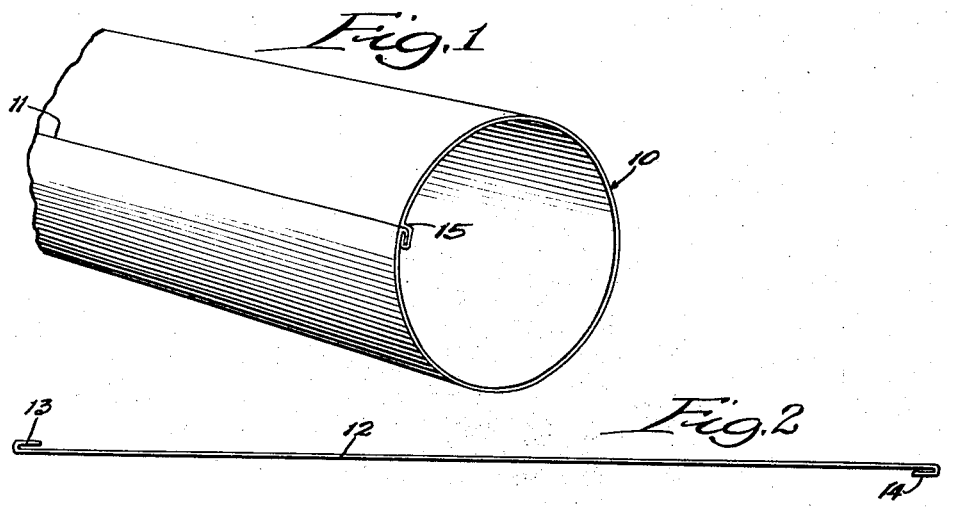
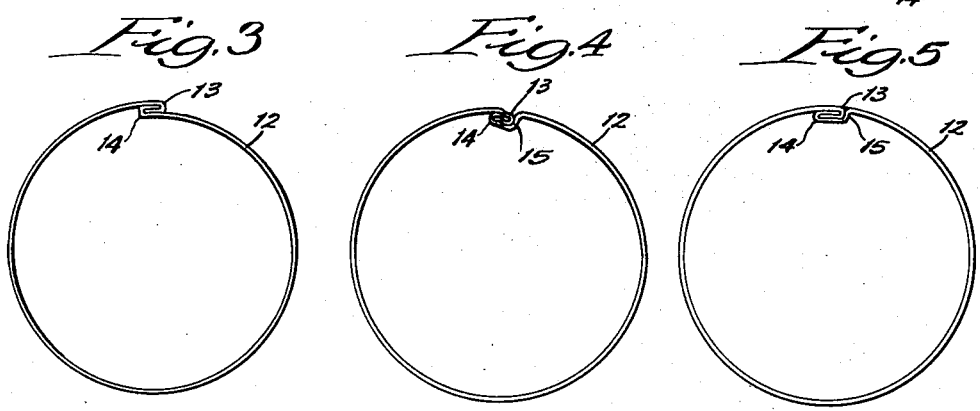
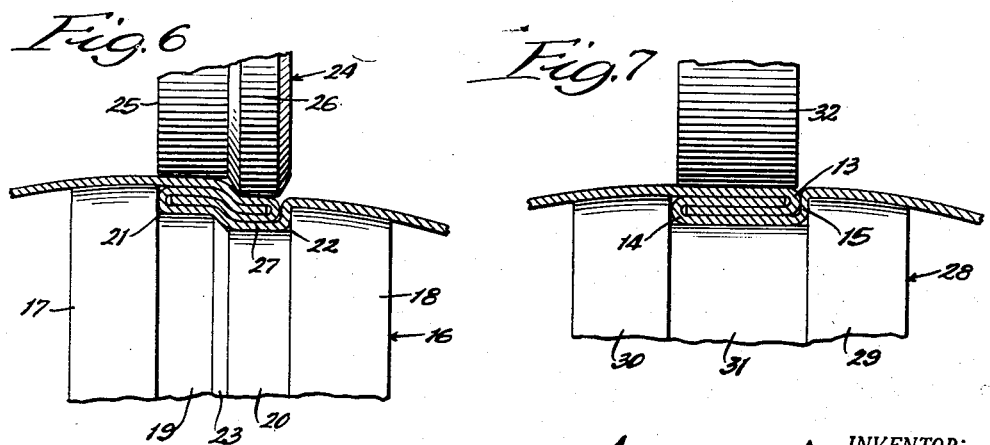
INVENTOR:
Tillman F. Jones
BY
Dawson, Tilton & Graham,
ATTORNEYS.

United States Patent Office 2,845,889
Patented Aug. 5, 1958

2,845,889

METHOD OF FORMING A FLOW CONDUIT

Tillman F. Jones, Wichita, Kans., assignor to The Coleman Company, Inc., Wichita, Kans., a corporation of Kansas Application August 25, 1953, Serial No. 376,421

2 Claims. (Cl. 113—34)

This invention relates to flow conduits, and more particularly to a method of forming fluid flow conduits and to the article formed thereby.

There are a number of applications wherein fluid flow conduits are formed from relatively thin sheet metal. A familiar use is in the heating and ventilating industry where distribution conduits are frequently formed of such material. Generally, the sheet metal is cut in elongated strips and the longitudinal edges of the strip are folded over in oppositely-facing directions to provide hook portions adapted to mate, and they are brought into interlocking relation when the sheet is rolled into cylindrical form. The interlocking hooks are then pressed together to provide a fairly rigid joint.

Fluid flow conduit formed in this manner have been satisfactory when used in gravity air heating systems, for example, and elsewhere where fluid flowing through the conduit is at relatively low pressure. These conduits have not, however, proved completely satisfactory where the fluid flow therethrough is under relatively high pressure, for the interlocking hook joint leaks, causing a loss of pressure and fluid that results in waste and general inefficiency. An example of such a use is in the "Blend-Air" heating system of The Coleman Company, Inc., in which air heated to a high temperature is distributed through small sheet metal conduits at high velocity and under relatively high pressure and is mixed with room air in an enlarged chamber prior to its being discharged into a room. Reference may be made to the pending application of Jack W. Kice, filed July 29, 1950, and assigned Serial No. 176,666, now abandoned, for a more complete description of such a system.

It is, accordingly, an object of this invention to provide a flow conduit and method of forming a flow conduit having interlocking edge portions providing a seam and in which the seam is fluid-tight so that the fluid flowing through the conduit at relatively high pressure does not leak through the seam. Another object of the invention is in providing a sheet metal conduit and method of forming the same having interlocking edge portions forming a longitudinally-extending seam and in which the seam is tight and air or other gaseous fluid under pressure may flow through the pipe without loss thereof through the seam. Another object of the invention is to furnish a joint wherein a maximum compressive resistance to the compressive action of the coupling is provided and in which this compressive resistance factor is continuous through the entire length of the conduit. Yet another object is to furnish a conduit and method of forming the same in which a longitudinally-extending joint therethrough the length of the conduit is provided that is fluid tight and sturdy and the necessity of spot-welding the joint is eliminated.

Still another object is in the provision of a flow conduit and method of forming the conduit wherein a sheet metal strip is equipped along the longitudinal edges thereof with hook portions that interlock when the strip is rolled to form the conduit, the conduit having a longitudinally-extending shoulder adjacent the seam and arranged to provide a lock positively holding the interlock hook portions together, with the result that a rigid seam is provided and one that will not separate even when subjected to a sawing operation forming a longitudinal or transverse severance therethrough. A further object is in providing a method of forming a conduit in accordance with the above description wherein the shoulder is formed in a continuous manufacturing manufacturing operation with the result that the conduit is cheaply and easily fabricated in a mass production operation; the conduit formed having a rigid, fluid-tight seam. Additional object and advantages will appear as the specification proceeds.

Embodiments of the invention are illustrated in the accompanying drawings, wherein—

Figure 1 is a broken perspective view of a flow conduit embodying my invention. Figures 2 through 5 show steps in the method of forming the conduit and in which Figure 2 shows an elongated strip of material equipped with hook portions along the edges thereof and before the material is rolled to form the conduit. Figure 6 is a transverse sectional view showing the step of forming the shoulder in the conduit. Figure 7 is a transverse sectional view showing the final step in the process.

A flow conduit embodying my invention is illustrated in Figure 1 and is designated by the numeral 10. The conduit 10 is shown in cylindrical form, but it should be understood that the conduit may readily be square or rectangular or have any other cross-sectional configuration. The conduit 10 may also be formed of any suitable material that is sufficiently malleable to permit the formation of hook portions along the longitudinal edges thereof and to permit the material to be rolled upon itself to provide the closed conduit. Usually sheet metal is used to form fluid flow conduits of this character, and I prefer to use sheet metal for forming the flow conduit incorporating may invention. The conduit 10 is equipped with a longitudinally-extending seam 11.

The seam 11 is formed when an elongated strip of material designated by the numeral 12 and shown in Figure 2 is equipped along the longitudinal edges thereof with oppositely-facing hook portions 13 and 14 that are adapted to mate when brought into interlocking engagement. As is illustrated best in any of Figures 3 through 7, the hook portion 14 is on the interior of the conduit, while the hook portion 13 overlaps the same and is on the outside of the conduit. The conduit 10 is equipped with a longitudinally-extending shoulder 15 that extends in parallel relation with the seam 11 and substantially abuts one of the hook portions 13 or 14. Preferably the shoulder 15 abuts the outer hook portion 13, as is illustrated in Figs. 1 and 5.

The shoulder 15 provides a positive stop or lock that rigidly unites the hook portions 13 and 14 and prevents relative movement therebetween. In other words, once the hook portions 13 and 14 are brought into interlocking relation with the shoulder 15 abutting the hook portion 13, a rigid conduit structure is provided and it is virtually impossible to separate the hook portions so as to release the sheet of material from the rolled condition forming the conduit. The conduit formed with the interlocking hook portions 13 and 14 and the shoulder 15 is a sturdy structure that may be subjected to relatively severe handling during storage and installation, etc., without danger of the hook portions coming apart. Further, the joint or seam 11 provided by this construction permits either a longitudinal or transverse severance of the conduit 10 through the seam portion 11 without endangering release of the interlocking hook portions.

In the method of forming the conduit 10, an elongated strip of material 12 is first provided with longitudinal edge portions equipped with complementary hooks 13 and 14 which are adapted to be brought into interlocking relation. After the formation of the hooks 13 and 14, the sheet of material is rolled upon itself to form a closed passage for the flow of fluid therethrough and the hook portions 13 and 14 are brought into interlocking relation to maintain the strip of material 12 in the rolled condition.

Subsequent to the step in which the strip of material is rolled and the hook portions brought into interlocking relation, the conduit 10 is then pressed downwardly along the seam 11 while the adjacent portion of the conduit wall is held rigid and the shoulder 15 is thereby formed. This step is illustrated in Figure 4. Next, the entire seam portion provided by the interlocked hooks 13 and 14 is pressed together so that the outer periphery of the conduit 10 is smooth and so that the outer hook portion 13 is forced into tight, abutting relation with the depending shoulder 15. This step completes the formation of the conduit 10 and the completed conduit is illustrated in Figure 5 as well as in Figure 1.

The positive lock provided by the shoulder 15 and hook portions 13 and 14 is adapted to a mass production operation and the steps in such a fabricating procedure are illustrated in Figures 6 and 7. Preferably then, after the hook portions 13 and 14 are brought into interlocking relation, the closed conduit is passed over a supporting spool 16 having an enlarged cylindrical portion 17 that engages the wall of the conduit on one side of the seam 11 and a cylindrical portion 18 of reduced diameter that engages and supports the wall of the conduit adjacent the opposite side of the seam 11. The cylindrical spool portions 17 and 18 are spaced apart, and interposed between the two are a pair of cylindrical surfaces 19 and 20 that engage the seam proper along the inner wall provided by the inner hook 14. The portion 19 is smaller in diameter than is the spool portion 17 adjacent thereto, so that a recess 21 is provided between the wall of the conduit and the peripheral surface of the portion 19, and into this recess approximately one-half of the total cross-sectional area of the hook portions 13 and 14 is received. The portion 20 has a smaller diameter than both the spool portion 19 and spool portion 18, and a shoulder 22 is provided by the enlargement of the spool portion 18 as it extends laterally from the spool portion 20. The shoulder 22 is important in that it serves an important function in the forming of the shoulder 15 in the conduit 10. Preferably, an inclined shoulder portion 23 is provided between the spool portions 19 and 20.

Above the spool 16 and spaced therefrom is the driving roller 24. Preferably the surface of the driving roller is knurled so that the frictional engagement between the roller and the surface of the conduit 10 is sufficient to insure movement of the conduit between the spool 16 and driving roller 24. The roller 24 provides a cylindrical portion 25 that cooperates with the spool portion 19 and an enlarged roller portion 26 which cooperates with the spool portion 20 and the shoulder 22, as is illustrated clearly in Figure 6. Thus, as the rolled sheet material 12 with the hook portions 13 and 14 thereof in interlocking engagement are drawn between the spool 16 and roller 24, the spool portion 20 and roller portion 26 cooperate to depress a portion of the interlocked hooks, as is illustrated in Figure 6 and is designated generally with the numeral 27. This depressing operation forms the shoulder 22.

To finish the conduit 10 and to provide an even and smooth periphery thereabout, the subsequent step illustrated in Figure 7 is preferably provided. In this operation, the hook portions 13 and 14 which have the inwardly-pressed area 27 formed therein, are passed over a supporting spool 28 that has on each side thereof enlarged cylindrical portions 29 and 30 that are spaced apart and have a portion 31 of reduced diameter interposed therebetween. The spacing between the support members 30 and 29 is sufficient to receive the entire width of the interlocked hook portions 13 and 14. The areas of the conduit on each side of the seam 11 are supported upon the peripheral surfaces of the support members 29 and 30.

Cooperating with the support spool 28 is a roller 32 that is preferably knurled so that the frictional engagement with the conduit is sufficient to insure its movement between the spool and roller. The width of the roller 32 is approximately equal to that of the spool support portion 31, and together these members cooperate to even the interlocked hooks 13 and 14 so as to finish the conduit structure, as is illustrated in Figure 7 and as is also shown in Figure 5. Although the structure shown in Figure 7 flattens out the hooks 13 and 14, it does not remove the shoulder 15 and it can be clearly seen in Figure 7 that the shoulder 15 tightly abuts the arcuate portion of the outer hook 13.

If desired, both of the spool support members illustrated in Figures 6 and 7 which have been designated with the numerals 16 and 28, respectively, may have knurled surfaces that cooperate with the knurled peripheral surfaces of the driving rollers 24 and 32. At least one of the spool members or one of the roller members must be a driven member and preferably in each of the illustrations in Figures 6 and 7 the roller member is the driven member. If desired, both the spool and roller in each case may be driven.

The method herein set out is effective to provide my conduit in a mass fabricating operation so that the structure is not excessively expensive and will compete economically with conduits that are less desirable. The shoulder 15 provides a positive lock that prevents separation of the interlocking hook positions 13 and 14, with the result that a rigid and surely-formed conduit is provided. The conduit may be subjected to various operations that are usual in installation and also those that are not customarily applied to conduits of this general character, such as splitting the conduit longitudinally through the seam. Further, it has been found that in use the seam is fluid tight and even where the fluid flow is under relatively high pressure, there is no fluid loss.

While in the foregoing specification a conduit structure embodying my invention and a method for forming the conduit have both been set out in considerable detail for purposes of illustration, it will be apparent that these details may be varied by those skilled in the art without departing from the spirit and principles of the invention.

I claim:

1. In a method of forming a flow conduit adapted for use in comparatively high pressure fluid flow systems, the steps of folding an elongated sheet of sheet metal upon itself along each of the longitudinal edges thereof to form complementary hook portions, bringing said hook portions into interlocking engagement to form a conduit having a longitudinally extending seam wherein one said longitudinal edge overlies the other, pressing the overlying longitudinal edge portion of said seam downwardly along a line extending longitudinally along substantially the center thereof to provide a stepped seam and forming a shoulder in the other said longitudinal edge of said sheet extending along and substantially abutting the depressed portion of the seam, and thereafter pressing downwardly upon the entire seam while limiting transverse expansion thereof to provide a conduit having a substantially smooth periphery in the area thereof adjacent said seam and wherein the said shoulder provides a substantially rigid lock for said complementary hook portions.

2. The method of claim 1 in which said shoulder is formed at substantially the same time that the longitudinal edge portion of said seam is pressed downwardly.

References Cited in the file of this patent

UNITED STATES PATENTS

| | | |
|---|---|---|
| 137,991 | Wilmot | Apr. 15, 1873 |
| 1,571,412 | Irvin | Feb. 2, 1926 |
| 1,681,880 | Schneible | Aug. 21, 1928 |
| 1,728,168 | Pratt | Sept. 10, 1929 |
| 2,086,143 | Van Huffel | July 6, 1937 |
| 2,170,639 | Hopkins | Aug. 22, 1939 |
| 2,221,208 | Sims | Nov. 12, 1940 |